(12) United States Patent
Apvrille (10) Patent No.: US 10,484,397 B2
(45) Date of Patent: Nov. 19, 2019

(54) AUTOMATIC ELECTRONIC MAIL (EMAIL) ENCRYPTION BY EMAIL SERVERS

(71) Applicant: Fortinet, Inc., Sunnyvale, CA (US)

(72) Inventor: Axelle Apvrille, Biot (FR)

(73) Assignee: Fortinet, Inc., Sunnyvale, CA (US)

( * ) Notice: Subject to any disclaimer, the term of this patent is extended or adjusted under 35 U.S.C. 154(b) by 189 days.

(21) Appl. No.: 15/640,387

(22) Filed: Jun. 30, 2017

(65) Prior Publication Data
US 2019/0007423 A1    Jan. 3, 2019

(51) Int. Cl.
*H04L 9/32* (2006.01)
*H04L 29/06* (2006.01)
*H04L 12/58* (2006.01)

(52) U.S. Cl.
CPC ........ *H04L 63/123* (2013.01); *H04L 63/0272* (2013.01); *H04L 63/0435* (2013.01); *H04L 63/0442* (2013.01); *H04L 63/061* (2013.01); *H04L 63/0861* (2013.01); *H04L 51/08* (2013.01)

(58) Field of Classification Search
CPC ............... H04L 63/123; H04L 63/0272; H04L 63/0435; H04L 63/0442; H04L 63/061; H04L 63/0861
USPC .......................................................... 713/170
See application file for complete search history.

(56) References Cited

U.S. PATENT DOCUMENTS

| | | | |
|---|---|---|---|
| 7,921,292 B1* | 4/2011 | Pauker | H04L 9/083 713/171 |
| 2002/0023213 A1* | 2/2002 | Walker | H04L 63/0442 713/168 |
| 2002/0138735 A1* | 9/2002 | Felt | G06Q 20/3829 713/176 |
| 2003/0147536 A1* | 8/2003 | Andivahis | H04L 63/06 380/277 |
| 2003/0154371 A1* | 8/2003 | Filipi-Martin | H04L 63/0442 713/153 |
| 2004/0133520 A1* | 7/2004 | Callas | G06Q 10/107 705/51 |
| 2006/0230461 A1* | 10/2006 | Hauser | H04L 63/0407 726/27 |
| 2007/0130464 A1* | 6/2007 | Swedor | H04L 63/0442 713/170 |

(Continued)

OTHER PUBLICATIONS

Adam J. Aviv; Secure Searchable Automated Remote Email Storage; IEEE; p. 129-138 (Year: 2017).*

*Primary Examiner* — Monjur Rahim
(74) *Attorney, Agent, or Firm* — Jaffery Watson Mendonsa & Hamilton, LLP (57) ABSTRACT

Systems and methods for automated email encryption between email servers are provided. According to one embodiment, an email, originated by a sender using a client device coupled with a private network and directed to a recipient, is received by an email server associated with the private network. A key server is queried for public keys of the recipient and the sender. When the recipient's public key is returned by the key server, it is used to encrypt the email message; otherwise, no encryption is performed. When the sender's public key does not exist on the key server, the email server automatically generates a temporary key pair for the sender on the fly and without requiring intervention on the part of the sender. Finally, both the email message and the public key of the sender are transmitted by the email server to the recipient.

20 Claims, 7 Drawing Sheets

(56) References Cited

U.S. PATENT DOCUMENTS

| | | | |
|---|---|---|---|
| 2007/0269041 A1* | 11/2007 | Bhatnagar | H04L 63/0428 380/30 |
| 2008/0118070 A1* | 5/2008 | Yeap | H04L 63/0823 380/282 |
| 2008/0294726 A1* | 11/2008 | Sidman | H04L 29/12386 709/206 |
| 2010/0217984 A1* | 8/2010 | Hill | G06Q 10/107 713/168 |

* cited by examiner

AUTOMATIC ELECTRONIC MAIL (EMAIL) ENCRYPTION BY EMAIL SERVERS

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2017, Fortinet, Inc.

BACKGROUND

Field

Embodiments of the present invention generally relate to secured electronic mail (email) communication. In particular, embodiments of the present invention relate to systems and methods for enabling secured email communication by automatically encrypting and decrypting email by email servers using a public-key based encryption system.

Description of the Related Art

Encrypted data transfer between computer systems via the Internet is widely used to exchange sensitive data among enterprise partners and for other uses. Symmetric and asymmetric encryption techniques are both used. Symmetric encryption techniques utilize a single encryption key value to both encrypt and decrypt data. Accordingly, both a sender and a receiver must have possession of the symmetric key to implement secure data delivery. Asymmetric encryption techniques, on the other hand, utilize a pair of key values—a private key and a public key. Each key in the pair can decrypt data encrypted by the other key in the pair. The public key can be distributed to anybody, it is "public" and need not be kept secret. Reciprocally, a private key is only known to its holder and must be kept absolutely secret. Typically, a sender encrypts data with the public key of the recipient. The sender can do so because that public key is made publicly available via a key server, for example. The recipient is the only person able to decrypt the message, because he/she is the only person holding the private key that matches the public key used for encryption. Further, the holders of public keys can use the public key to encrypt private messages that can only be decrypted using the private key.

Gnu Privacy Guard (GPG) and Pretty Good Privacy (PGP) are examples of well-known asymmetric encryption and signature software. However, their use and configuration is burdensome to end users as most do not understand, among other things, what a public key is, what a private key is and that they need to use the recipient's public key to encrypt emails directed to the recipient. For example, a common mistake made by email senders is to erroneously encrypt an email with the sender's public key rather than recipient's public key. Even end users with technical skills seldom use GPG because it is difficult to setup. The end user must install GPG and then either manually initiate the encryption/decryption process on an email-by-email basis or use a plug-in for the Mail User Agent (MUA), both of which are tricky, complex, and time-consuming. Consequently, only a few security-oriented end-users use GPG regularly, resulting in the vast majority of emails being exchanged in unencrypted form.

Even Virtual Private Networks (VPNs) are not a convenient solution for email encryption as VPNs work between two given entities associated with the same enterprise, but not among numerous entities. As such VPNs do not address scenarios in which emails originating from a given site are typically directed to a wide variety of other sites. Furthermore, VPNs encrypt everything communicated between the participating sites, not only emails, and therefore, for email encryption, VPNs are overkill.

There is therefore a need for systems and methods that allow secured email communication without the need for end users of such systems to be concerned about encryption/decryption and configurations associated therewith.

SUMMARY

Systems and methods are described for automated email encryption between email servers. According to one embodiment, an email message, originated by a local sender using a client device coupled with a private network and directed to a remote recipient, is received by an electronic mail (email) server associated with the private network. The sender represents a first user of multiple users associated with the private network and the recipient represents a user that is not associated with the private network. One or more key servers are queried by the email server for a public key of the recipient. When the public key of the recipient is returned by the one or more key servers, then it is used to encrypt the email message. When the public key of the recipient does not exist, then no encryption is performed. The one or more key servers are queried by the email server for a public key of the sender. When the public key of the sender does not exist on the one or more key servers, then the email server automatically generates a temporary key pair for the sender on the fly and without requiring intervention on the part of the sender. Finally, both the email message and the public key of the sender are transmitted by the email server to the recipient.

Other features of embodiments of the present invention will be apparent from accompanying drawings and from detailed description that follows.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Systems and methods are described for automated email encryption between email servers. Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

If the specification states a component or feature "may", "can", "could", or "might" be included or have a characteristic, that particular component or feature is not required to be included or have the characteristic.

Systems and methods are described for automated email encryption between email servers.

In an aspect, the present disclosure relates to a method including the steps of receiving, by an electronic mail (email) server, from a client device that is operatively coupled with the email server, an email originated by a sender associated with the client device and directed to a recipient; querying one or more key servers for a public key of the recipient such that when the public key of the recipient is returned by the one or more key servers, the public key of the recipient is used to encrypt the email, whereas if the public key of the recipient does not exist, encryption of the email can be skipped. The method of the present disclosure can further include the step of querying the one or more key servers for a public key of the sender such that if the public key of the sender does not exist on the one or more key servers, an asymmetric temporary key pair for the sender can be automatically generated on the fly without requiring intervention on the part of the sender, wherein the asymmetric temporary key pair for the sender includes the public key of the sender and a private key of the sender. The method can further include the step of transmitting, by the email server, both the email and the public key of the sender to (an email server used by) the recipient.

In an aspect, the temporary key pair can include a Pretty Good Privacy (PGP) key pair or a Gnu Privacy Guard (GPG) key pair.

In another aspect, the step of transmitting, by the email server, both the email and the public key of the sender to the recipient can include including the public key of the sender as an attachment to the email.

In an aspect, the method can further include the step of storing, by the email server, the private key of the sender within a secured storage area accessible by the email server.

In another aspect, the secured storage area can be selected from any or a combination of a secured random access memory (RAM) and an encrypted disk.

In yet another aspect, the private key of the sender can be protected by an authentication processes, which can, in an instance, include biometric authentication.

In yet another aspect, the method can further include digitally signing the email by the email server prior to transmitting both the email and the public key of the sender to the recipient.

In an aspect, the present disclosure further relates to a system comprising a non-transitory storage device having embodied therein one or more routines operable to perform encrypted transmission of email; and one or more processors coupled to the non-transitory storage device and operable to execute the one or more routines, wherein the one or more routines can be configured to: receive, by an electronic mail (email) server configured in the system, from a client device that is operatively coupled with the email server, an email originated by a sender associated with the client device and directed to a recipient; query one or more key servers for a public key of the recipient such that when the public key of the recipient is returned by the one or more key servers, the public key of the recipient is used to encrypt the email, else if the public key of the recipient does not exist, encryption of the email is forgone; query the one or more key servers for a public key of the sender such that if the public key of the sender does not exist on the one or more key servers, an asymmetric temporary key pair is automatically generated for the sender on the fly without requiring intervention on the part of the sender, wherein the asymmetric temporary key pair for the sender includes the public key of the sender and a private key of the sender; and transmit, by the email server, both the email and the public key of the sender to the recipient.

In another aspect, present invention further relates an electronic mail (email) server including: a non-transitory storage device having embodied therein one or more routines operable to perform encrypted transmission of email; and one or more processors coupled to the non-transitory storage device and operable to execute the one or more routines, wherein the one or more routines can include: an email receive module, which when executed by the one or more processors, can receive, from a client device that is operatively coupled with the email server, an email originated by a sender associated with the client device and directed to a recipient; an encryption module, which when executed by the one or more processors, can encrypt, using a public-key based encryption system, the email; and an encrypted email transmission module, which when executed by the one or more processors, can transmit the encrypted email to the recipient.

In an aspect, system of the present disclosure enables installation and configuration of a public-key based email encryption system (for example, Open PGP, GNU Privacy Guard—GPG, PGP and the like) to be achieved without any user intervention and effort. The users can be totally unaware of the system of the present disclosure and its functioning (that is, the system of the present disclosure is transparent/hidden to the end users). The system of the present disclosure can be configured in email servers that in addition to the new functionality described herein can operate as they usually do.

In another aspect, encryption keys (for example, GPG keys in a GPG system) of senders can be automatically generated on the fly (that is, only when needed responsive to a request to send an email message), and can be made valid temporarily—only for a short period—for enhanced security during an exchange of email messages between a sender and a recipient, for example. Such keys may also, in an implementation, be made permanent for the respective user once generated on the fly.

In yet another aspect, the public key of the sender can be transmitted along with the email, as is well known in the art, so that recipient of the email can encrypt a return email directed to the sender using the senders' public key. In an aspect, the public key can either be sent as an attachment in the email, or the email can carry a URL that can link to the public key held at a secure website, for example, or by one or more key servers.

In an exemplary aspect, an email server implemented in accordance with an embodiment of the present invention, prior to sending an email, the email and/or the public key of the sender can be signed using the senders' private key, wherein the signature of the sender can be verified by the recipient using public key of the sender.

In another aspect, a system of the present disclosure can provide for emails to be sent unencrypted to a particular recipient the first time an email is sent to the particular recipient by the sender (as the public key of recipient may not be known to or obtainable by the sender). With such an unencrypted email, the email server can also include the public key of the sender (which, even if not available at the time of email transmission, can be, in accordance with an embodiment of the present invention, generated on the fly by the email server), which can then be used by the recipient to encrypt subsequent email messages from the recipient to the sender. When the recipient sends a reply email (now acting as a sender), assuming the recipient is associated with an email server implementing an embodiment of the present invention, the email server will encrypt the reply email with the public key of the original sender (now, the recipient) and will include the email originator's public key (which may also be generated on the fly if the user does not already have a key pair) along with the reply email. In an aspect, public keys of different users of the present system can be stored across one or more key servers, which can be queried by the email servers of the respective users while sending/transmitting an email so as to encrypt the email using public key(s) of recipient(s) as well as sending the public key of the email originator (the sender).

In yet another aspect, the system of the present disclosure can enable users to compose their email messages with any Mail User Agent (MUA), e.g., Outlook, Apple Mail, Thunderbird, Postbox or web-based email clients, like Gmail, which may be interchangeably referred to herein as an email client, and without any concerns and attention to aspects such as encryption, key generation, key exchange, key certificate(s), their expiration and the like, which normally need to be considered in existing systems. Those skilled in the art will appreciate suitable protocols, for example, Simple Mail Transfer Protocol (SMTP), Internet Message Access Protocol (IMAP) or Post Office Protocol version 3 (POP3) and the like, can be used for communications between an MUA an email server. Exemplary email servers include, but are not limited to, sendmail, Microsoft Exchange Server, Postfix and Exim.

In effect, embodiments of the present disclosure enable email users to send and receive encrypted mails without any change in their methods of sending and reading/receiving emails. Because embodiments of the present invention are implemented within an email server, the system of the present disclosure can work with any email client, operating system (OS) or browser, and there is no need to install an email encryption system on a client workstation or within an email client and there is no need for end users to manually generate parameters like key pairs. Depending upon the particular implementation, the system of the present disclosure can be integrated with other encryption systems, for example, GPG for enhanced security of emails.

In an aspect, the system of the present disclosure can enable a user to write an email and responsive to the user sending the email, it will be automatically encrypted by the enterprise's email server, for example. Assuming, the email server with which the recipient is associated also implements an embodiment of the present invention, the encrypted email directed to the recipient can be automatically decrypted before being delivered to the recipient, thereby enabling the recipient to read the email and making the encryption/decryption process transparent to both email senders and email recipients.

In an aspect, while in a preferred embodiment, the system of the present disclosure can use GPG to encrypt emails since it is one of the best known cryptographic tools and represents a free software replacement for Symantec's PGP cryptographic software suite, depending upon the particular implementation, the system of the present disclosure can be adapted for use with any public-key based encryption system.

Other features of embodiments of the present invention will be apparent from accompanying drawings and from detailed description that follows.

Figure 1A:
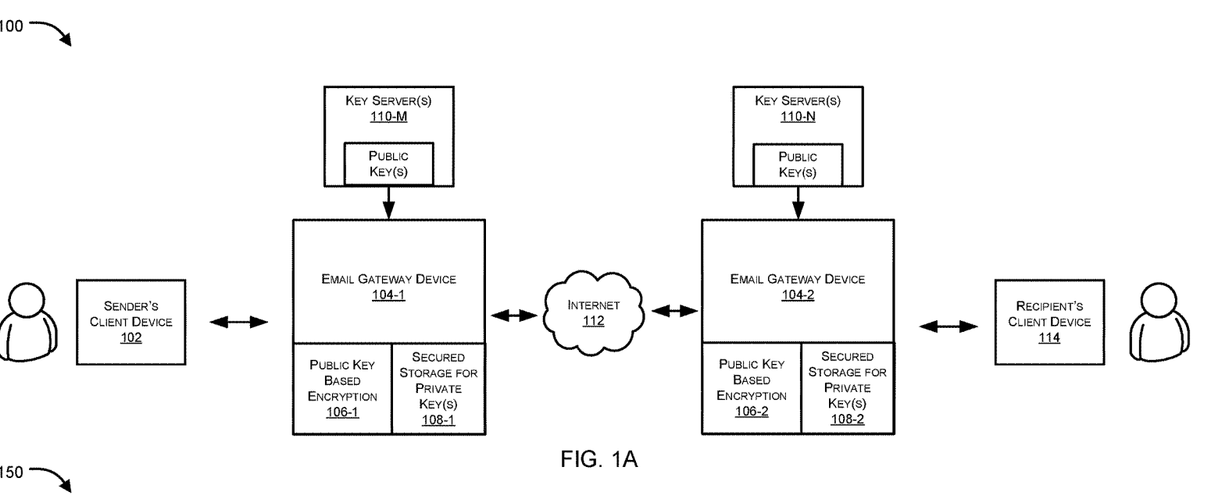
FIGS. 1A and 1B illustrate exemplary network implementation architectures in which or with which embodiments of the present invention can be implemented.
Figure 1B:
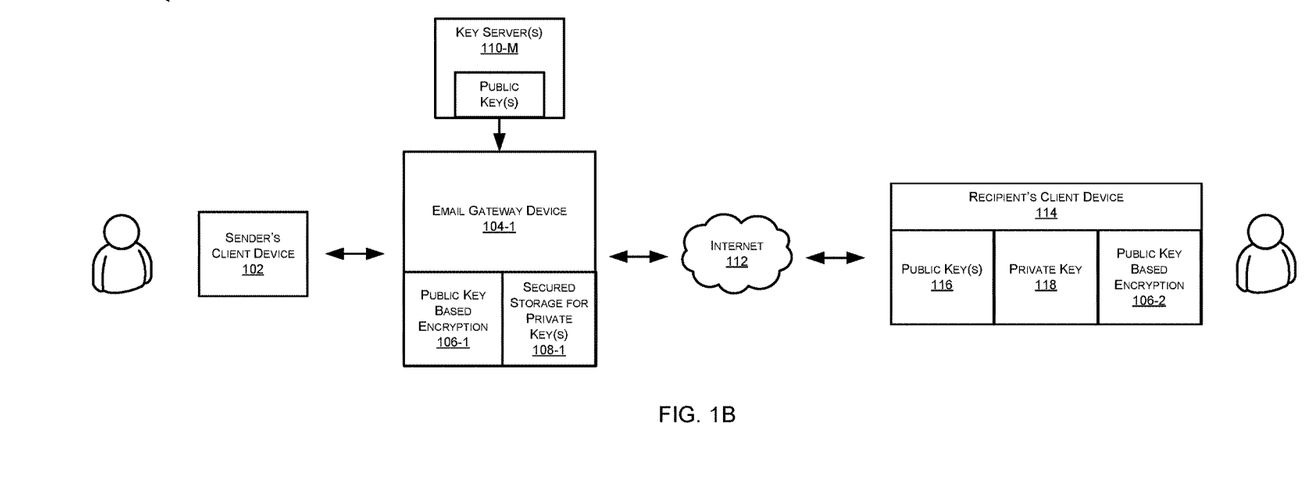

FIGS. 1A and 1B illustrate exemplary network implementation architectures in which or with which embodiments of the system of the present disclosure can be implemented.

FIG. 1A illustrates exemplary functioning of email gateway devices 104-1 and 104-2, in accordance with an embodiment of the present invention, when they are located on both ends of an email exchange. A client device can be any computing device including, but not limited to, a personal computer (PC), a tablet PC, a mobile phone, a desktop PC, a laptop, a wearable device, a smart phone, and other like devices.

In an aspect, the system of the present disclosure can be configured as part of an email server being used by a sender and/or a recipient of emails, wherein the email server can be configured within a client device of the sender/recipient or more typically may be implemented as a standalone server in operative communication with the client devices.

In another aspect, as illustrated in FIG. 1A, a sender's client device 102 can be operatively connected to an email server 104-1 that can be configured to receive public keys from key servers 110-M, and use such public keys for public key based encryption of emails that it can send, as indicated at 106-1. For such encryption, email server 104-1 can use a suitably configured encryption module that can be configured within email server 104-1, or can be in operative communication with it, as described further below.

In an exemplary embodiment, key servers 110-M can reside within the cloud, or may be configured within a publically accessible or subscription-based centralized computing device. Alternatively, a key server or a local cache might be locally implemented within email server 104-1 itself. Email server 104-1 can be configured to connect with key server(s) 110-M, and query them to retrieve a public key of an email sender and a public key of the recipient to which an email is directed (if and when available). Similarly, secured storage for private keys 108-1 can be configured in the cloud or can be locally implemented within email server 104-1 itself. Private keys 108-1 may be kept in a very secured storage medium that may have multiple security filters or may incorporate multiple levels of authentication, wherein email server 104-1 can be configured to connect to such a secured storage medium, and post authentication, retrieve a private key of an email sender/recipient, when so configured, for digitally signing emails during transmission or for decryption of received email(s), respectively.

In an aspect, under certain circumstances, email server 104-1 can automatically generate asymmetric public-private key pairs for an email user on the fly. For instance, if during transmission of an email, email server 104-1 determines that a public-private key pair for the sender is not available, email server 104-1 can automatically generate a temporary key pair and store the public key of the sender in key server(s) 110-M and store the private key in storage 108-1. When sending an email message originated by a local sender and directed to a remote recipient, email server 104-1 can send the public key of the local sender concurrently with the email message (e.g., as part of an attachment), and can subsequently use the private key of the sender to decrypt a reply email received from the recipient, wherein the reply email is encrypted at email server 104-2 at recipients' end using the public key of the sender.

In an aspect, storage 108-1 can be configured within email server 104-1 or can be in operative communication with it. In an exemplary embodiment, storage 108-1 can be implemented within a client device of the sender, and the private keys stored therein may be accessible only via an authentication mechanism, for example, biometric authentication, password authentication or two factor authentication.

In another aspect, email server 104-1 can be used for both sending email messages (or, emails for short) that it receives from sender's client device 102 to various recipients as well as for receiving emails (from other senders) meant to be forwarded to sender's client device 102. Emails received can be processed by email server 104-1 acting like a recipient's email server, that is, as email server 104-2 described hereunder. It can readily be understood that any user can operate as one or both of a sender and a recipient of emails.

In a similar manner, recipient's client device 114 can be operatively connected to an email server 104-2 that can be configured in accordance with embodiments of the present invention. Email server 104-2 can communicate with key servers 110-N for storage and/or retrieval of public keys and can likewise have public key based encryption indicated at 106-2 and a secured storage for private keys 108-2. Those skilled in the art will appreciate that key server(s) 110-M and 110-N may be one in the same and common for most email servers 104, or may be different based on the configuration of each email server 104, all such variations being well within the scope of the present invention.

In an exemplary embodiment, key servers 110-N may be implemented as cloud-based services accessible via the Internet, may be implemented in the form of a local enterprise-based service within a central computing device, or can be locally configured within email server 104-2 itself. Email server 104-2 can be configured to connect to key servers 110-N, and query them to retrieve the public keys of an email sender or an email recipient. Similarly, secured storage for private keys 108-2 can be configured in the cloud, or can be locally configured within email server 104-2 itself. Email server 104-2 can be configured to connect to secured storage 108-2 in order to retrieve a private key of an email recipient to allow a received email directed to the recipient in encrypted form to be automatically decrypted on behalf of the recipient.

In yet another aspect, for exchanging emails between sender's client device 102 and recipient's client device 114, the corresponding email servers can be configured to communicate with each other via a private or a public network, such as the Internet 112 as illustrated in FIG. 1A. In alternate exemplary embodiments, the network can be any other network configured to pass data e.g. a Local Area Network (LAN), a Wide Area Network (WAN) or any computer network that can enable two or more computing systems/devices to communicate with each other.

In an exemplary implementation, using the system of the present disclosure, a sender 102 can write an email using client device 102 with any standard email client (for example, MS Outlook, Thunderbird, etc.) that can be operatively connected to email server 104-1. When the email is submitted for delivery to the recipient via email server 104-1, email server 104-1 can be configured to query one or more key servers, for example, key servers 110-M in order to obtain a public key of recipient 114. When the public key of recipient 114 is available, email server 104-1 can use it to encrypt the email using public key based encryption 106-1. On the other hand, when email server 104-1 determines that no public key of recipient 114 exists in key servers 110-M, the email can be transmitted in unencrypted form to recipient 114. In an aspect, the public key of sender 102 may also be sent along with the email by email server 104-1 to facilitate encryption of return or reply email from recipient 114 to sender 102. In one embodiment, when the public key of sender 102 is not available, email server 104-1 can automatically generate a temporary asymmetric public-private key pair for sender 102, based on which the newly generated public key of sender 102 can be sent (by email server 104-1) to recipient 114 along with the email (for instance, as an attachment or part of a link/URL).

Upon receiving the email, email server 104-2, on behalf of recipient 114 (114 being used to refer to both the recipient as well as recipients' client device), can determine whether the email is unencrypted or encrypted. When the email is unencrypted, it is simply forwarded to recipient 114; otherwise if the email is encrypted (using the public key of recipient 114), email server 104-2 decrypts the email using the private key (that may be stored in secured storage 108-2) of recipient 114, and forwards the decrypted email to recipient 114. Those skilled in the art will appreciate that should recipient 114 subsequently send a reply email to sender 102, sender's public key is readily available to email server 104-2 as it was provided with the original email. Similar to the original email flow described above in connection with sender 102 sending an email to recipient 114, recipient can send an email to sender 102 via email server 104-2, which, determines whether a public-private key pair exists for recipient 114. When a public-private key pair is not available for recipient 114, a temporary asymmetric key pair can be generated by email server 104-2 on the fly and stored accordingly. Email server 104-2 can then encrypt the reply email using the public key of sender 102, and send the encrypted reply email along with the public key of recipient 114.

In an aspect, the private key of sender 102 can be used to digitally sign an email during transmission to recipient 114 and the digitally signed email can be verified at recipients' end (i.e., by email server of the recipient) using the public key of the sender, which public key of the sender is received by the email server of the recipient at the time of receipt of the email. Private key of the sender is also used for decrypting a reply email that has been sent to the sender by the recipient where the reply email is encrypted using public key of the sender.

It should be appreciated that intermediate servers, if any, between email servers 104-1 and 104-2 need not be configured with the proposed system as they are simply forwarding the email.

FIG. 1B illustrates functioning of a system in accordance with an embodiment of the present invention when it is implemented only on the sender's side of an email exchange.

In an aspect, a sender's client device 102 can be operatively connected to an email server 104-1 that is configured in accordance with an embodiment of the present invention, while a recipient's client device 114 may be using an existing public-key based encryption system (for example GPG or PGP). The recipient client device 114 may have the public-key based encryption system configured therein, as illustrated, or within an email client (not shown).

In an exemplary embodiment, a sender using client device 102 can compose an email message directed to a recipient using client device 114. After the email is sent via an email client (not shown) associated with client device 102, it is received by email server 104-1. Responsive to receipt of the outgoing email, email server 104-1 queries public key servers 110-M to find a public key for recipient 114 and uses such public key to encrypt the outgoing email. In an implementation, the public key for recipient may already exist as the recipient is already using a public-key based encryption system. In an exemplary embodiment, such a public key server can be https://pgp.mit.edu/.

In another aspect, the system of the present disclosure can similarly attempt to find a key pair (a GPG key pair, for example) for the sender. When email server 104-1 is unable to locate a key pair for sender 114, email server 104-1 can generate a temporary key pair on the fly, and can attach the newly generated public key of the sender to the encrypted mail message, while storing the private key of the sender in a secured storage for private keys 108-1.

In yet another aspect, once the recipient's client device 114 receives the encrypted email, it can decrypt it using its private key as it is configured with a public-key based encryption system already, for example GPG. As the email is encrypted using the public key of the recipient, it can be decrypted using the corresponding private key that the recipient already has access to (from its secured storage for private keys, for example). As already explained above, recipient client device 114 can extract the public key of the sender, store it in its public keys database 116, and use it to encrypt a reply to sender 102. Once email server 104-1 receives such an encrypted reply email via a network (for example, Internet 112), it can use the private key of sender 102 (that is already stored in its secured storage for private keys 108-1) to decrypt the encrypted reply email and forward it to sender's client device 102.

As those of skill in the art will appreciate, embodiments of the present invention facilitate exchange of encrypted email messages in a manner that is transparent to the email users by automatically generating temporary key pairs as needed, for example, when the sender has not already obtained an asymmetric key pair. In one embodiment, this automatic key generation requires no intervention on the part of the email sender or the email recipient, and may therefore be performed automatically. Further, the system of the present disclosure may forego authentication of users' identities, and may only encrypt the emails being exchanged. Therefore, on a GPG trust level (as elaborated at https://www.gnupg.org/gph/en/manual.html#AEN346), the key may be set as "Do NOT trust" or "unknown". In an aspect, as the system of the present disclosure generates key pairs on the fly, it may opt for shorter length keys so as to reduce the time required for key generation and reduce delays introduced into the email delivery process. In an exemplary embodiment, a public-key based encryption system for example that uses RSA-2048 can be favored over one using RSA-4096. Those skilled in the art will appreciate the key generation time can be adapted to various situations as desired. In another aspect, as the keys are difficult to revoke, authentication of the end user may not be performed and the automatically generated key pairs may be kept valid for only a short period of time. Hence, while usually key pairs are generated for at least one year, in the system of the present disclosure they can be configured for a shorter period of, for example, one week or one month. In an exemplary embodiment, the system of the present disclosure can use multiple public key servers that are standard in GPG, like SKS (as can be found at https://sks-keyservers.net). Public servers can be used when a sender sends an email to a recipient who already has a GPG key pair.

In another exemplary embodiment, the system of the present disclosure can use several local key servers that are directly accessible to email servers configured with the system of the present disclosure. Such servers can be configured to store the automatically generated public keys of senders/recipients they have already communicated with and also store securely automatically generated private keys of senders. In yet another exemplary embodiment, the private keys of senders may be stored directly on their client devices. As can readily be understood, all local servers may need to be synced at regular intervals depending upon the system requirements, email traffic etc.

In an aspect, if the recipients' mail server is not configured with system of the present disclosure, but has another public-key based encryption system, the recipient can still decrypt the received email, as described with reference to FIG. 1B. Likewise, if a recipient has a key pair (for example, a GPG key pair or a PGP key pair) and the public key has been published on a public key server, the system of the present disclosure can be configured to retrieve the public key from the public key server and use the public key to encrypt an email being sent to the recipient. Upon receipt of the encrypted email, the recipient's email system can be configured to use the corresponding private key already available to it to decrypt the email.

In an exemplary embodiment, when an email cannot be encrypted for any reason (for example, the system of the present disclosure not being able to find the public key of the recipient), the system of the present disclosure can be configured to an alert the sender or an administrator of the email server at issue, for example, "unable to encrypt the email" so that the sender or administrator can take appropriate action.

In an exemplary embodiment, the system of the present disclosure can be configured with a suitable web-interface that can display unencrypted emails, and the end-user (sender or recipient) doesn't need to bother about email encryption/decryption and configurations associated therewith, while all email traffic flowing between any two users whose email servers are configured (or operatively coupled) with the system of the present disclosure is encrypted during transmission.

As can be readily understood, any user can send encrypted emails as long as his/her client device transmits emails through an email server that is configured in accordance with embodiments of the present disclosure. Likewise, the user can read email messages sent to him/her in encrypted form as the email server automatically decrypts encrypted email messages using his/her private key.

It can be appreciated that system of the present disclosure decrypts emails at an email server before sending it to a client device of a user, that is, there is no email security between a client device and its corresponding email server. Further, while the system of the present disclosure ensures email encryption, it does not authenticate its users. It is desirable for email users to have access (e.g., authenticated access) to secured storage for private keys to decrypt an email and hence, to prevent downgrade attacks where an attacker can prevent the system from retrieving the keys on purpose, it is important to ensure that the local key server (storing private keys) is always accessible from the system of the present disclosure and is well secured by appropriate user authentication means. In a downgrade attack, a user's email server can abandon encryption since it is not able to retrieve appropriate keys and shift to an unencrypted mode of operation that is undesirable.

Figure 2:
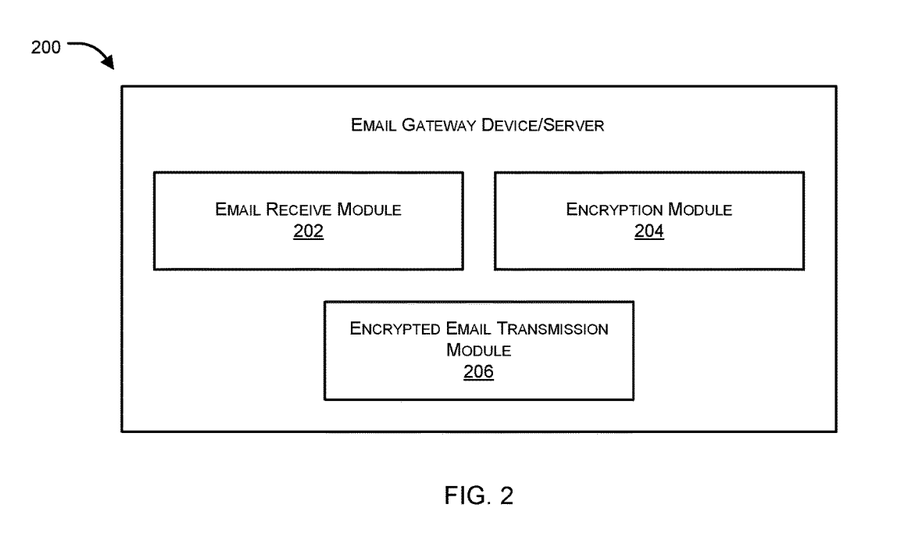
FIG. 2 illustrates an exemplary module diagram for performing automatic encryption of emails using a public-key based encryption system in accordance with an embodiment of the present invention.

FIG. 2 illustrates an exemplary module diagram for performing automatic encryption of emails using a public-key based encryption system in accordance with an embodiment of the present invention.

In an aspect, the system of the present disclosure can be configured within an email server 200 that is operatively coupled to a computing device (which may be interchangeably referred to as a client device) of a sender, wherein email server 200 can be configured with functional modules as elaborated hereunder to deliver an email to another email server associated with the intended recipient of the email after encrypting the email.

While in the present example, the modules 202, 204 and 206 are described as being implemented within email server 200, in an alternative embodiment, the modules described herein may be distributed among computing devices of the users and the email servers depending upon the needs of the particular implementation. In another exemplary embodiment, email servers and modules therein can be configured in cloud/central computing device. Appropriate user interfaces, databases and Application Programming Interfaces (APIs) can be provided to enable operation of the system of the present disclosure. All such implementations that enable aspects of the system of the present disclosure (i.e. to using key pairs to encrypt/decrypt emails and generating such key pairs on the fly when not available) are well within the scope of the present disclosure.

In an aspect, email server 200 can include an email receive module 202 that can receive, from a client device (not shown) operatively coupled thereto, an email originated by a local sender and directed to a remote recipient.

In a similar manner, several emails can be sent using several client devices directed towards several recipients.

In another aspect, module 202 can pass the received outgoing email to encryption module 204 for encryption, as elaborated herein.

In an aspect, encryption module 204 can encrypt, using a public-key based encryption system, the outgoing email before its transmission to an email server associated with the recipient. For this purpose, module 204 can query public key servers (that can be configured within the cloud or can be part of a network to which module 204 has access) and obtain the public key of the recipient. In an exemplary embodiment, the public key can be stored in key servers that can be operatively connected to the email server of the sender and can be provided to email server (and module 204 therein) as required. In a similar manner, module 204 can obtain public keys of any/several/all recipients that the email server has been configured to send emails to, and use these public keys for encryption of emails being sent to these recipients.

In another aspect, when the public key of the recipient is not found by module 204, it can forego encryption and send, at this time, an unencrypted email to the recipient, while subsequent emails can be encrypted, as elaborated above, after a public key has been automatically generated by the recipient's email server, for example, and provided as part of a reply email message.

In another aspect, module 204 can provide the encrypted email to module 206 for transmission to the email server of the recipient.

In an aspect, if module 204 is able to obtain the public key of the recipient from one or more key servers that it is in operative communication therewith, module 204 can use the public key of the recipient to encrypt the outbound email. In another aspect, if the public key of the recipient does not exist, or module 204 has no access to it, module 204 can forego encryption of the email and cause it to be transmitted in unencrypted form.

In another aspect, module 204 can query one or more key servers for a public key of the sender such that if the public key of the sender does not exist, or module 204 has no access to it, module 204 can automatically generate a temporary key pair for the sender on the fly and without requiring intervention on the part of the sender, wherein the asymmetric temporary key pair for the sender can include the public key of the sender and a private key of the sender.

In an aspect, module 204 can provide the encrypted email and the public key of the sender to module 206 for onward transmission to email server of the recipient.

In an aspect, encrypted email transmission module 206 can transmit the encrypted email to the email server of the recipient that can be configured to receive, decrypt and transmit the decrypted email to its intended recipient as elaborated in FIG. 1 above.

While above describes an email server (e.g., a sender's email server) and modules configured therein for receiving an outbound email from a sender directed to a recipient, encrypting it and transmitting the encrypted mail to an email server configured to receive emails on behalf of the recipient (recipient's email server), it can readily be understood that the reverse processes, i.e., receipt of an encrypted email, its decryption and transmission of the decrypted mail to recipient's client device are performed at the recipient's email server to deliver the email (in decrypted form) to the recipient's client device. Such reverse processes can be accomplished at the recipient's email server using modules similar to those as elaborated above, except working in reverse fashion, as detailed in FIG. 1. Further, as those skilled in the art will appreciate an email server can be readily configured to both send and receive emails. That is, an email server (say X) can be configured to send out encrypted mails for other users (say users B1, B2, . . . , and Bn) that may be in operative communication with other email servers (say Y1, Y2, . . . , and Yn), and also receive and decrypt encrypted emails for its users (say users A1, A2, . . . , and An) that it may be receiving from other people, including B1, B2 . . . Bn. When user B1 in turn wants to send out an email directed to user A1, email server Y1 can readily be configured to receive this email from user B1, encrypt it and transmit the encrypted mail to email server X (which is the same email server that is being used by user A1 to send out emails) that can likewise be configured to receive the encrypted email, decrypt it, and transmit the decrypted email to user A1 on A1's client device. In this manner, two email servers (and similarly, all email servers) that are in operative communication with each other and are configured with the system of the present disclosure, can enable exchange of encrypted emails between themselves, while their users can send normal (decrypted emails) and receive decrypted emails without being aware of any encryption/decryption and configurations associated therewith.

Figure 3A:
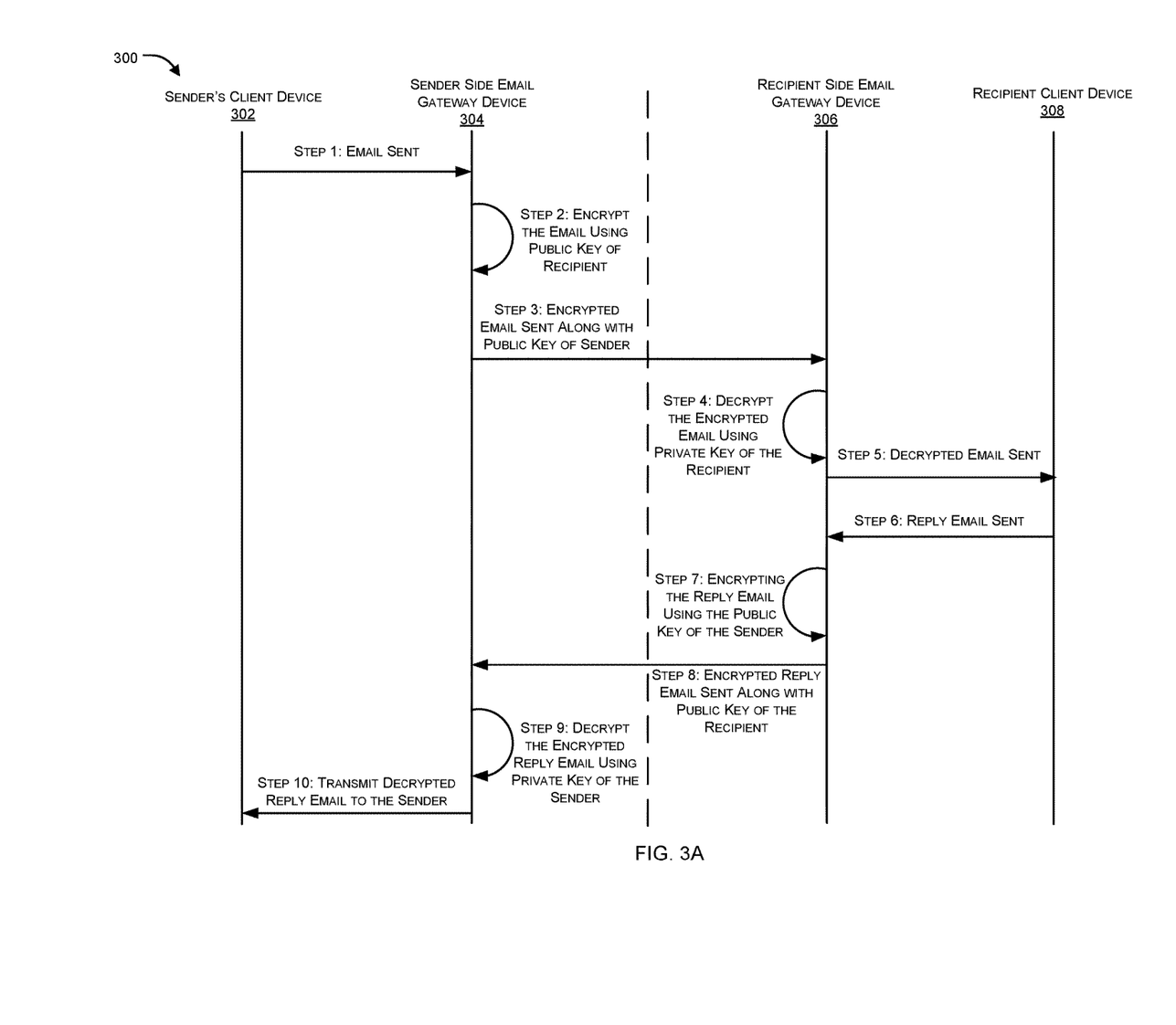
FIGS. 3A and 3B are sequence diagrams illustrating how email servers associated with respective client devices can perform automatic encryption and decryption of email messages exchanged between the client devices using a public-key based encryption system in accordance with an embodiment of the present invention.
Figure 3B:
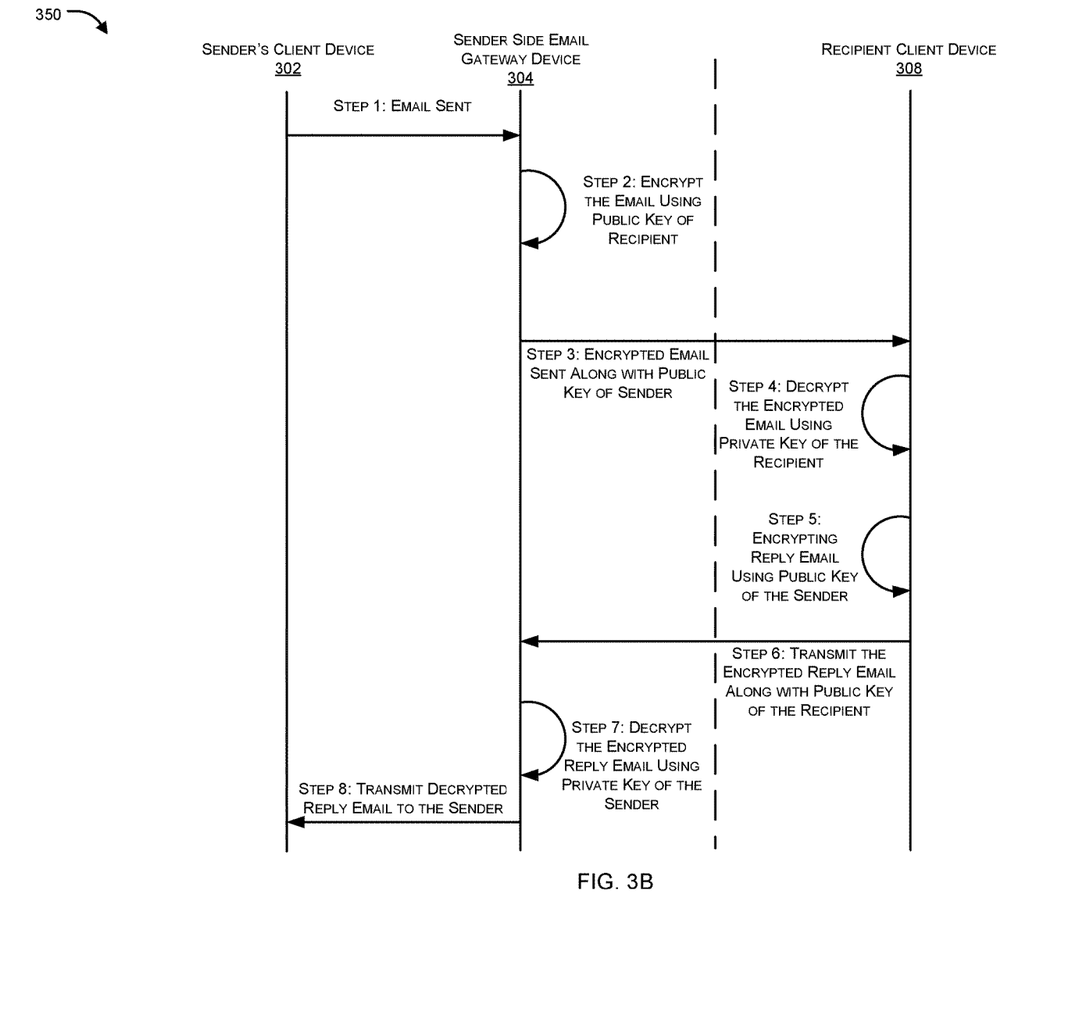

FIGS. 3A and 3B illustrate exemplary sequence diagrams showing how email servers associated with respective client devices can perform automatic encryption and decryption of emails exchanged between the client devices using a public-key based encryption system in accordance with an embodiment of the present invention.

FIG. 3A illustrates processing performed by email servers, wherein an email server on the sender side (sender side mail gateway device 304) as well as an email server on the recipient side (recipient side email gateway device 306) are both configured in accordance with an embodiment of the present invention.

In an aspect, sender side email server 304 can be configured with the system of the present disclosure and be in operative communication with a sender's client device 302. Likewise, recipient side email server 306 can be configured with the system of the present disclosure and be in operative communication with a recipient client device 308.

In another aspect, at step 1, a sender can use a client device 302 to send an email directed to the recipient via email server 304. Responsive to receipt of the outbound email message, email server 304 can encrypt the email using the public key of the recipient, as illustrated at step 2, and, as illustrated at step 3, email server 304 can send the encrypted email along with the public key of the sender to recipient side email server 306.

In an aspect, upon receipt of the encrypted email, email server 306 can decrypt the encrypted email using the private key of the recipient, as shown at step 4, and email server 306 can send the decrypted email to appropriately configured client device 308 of the recipient, as shown at step 5.

In another aspect, in a similar manner, the recipient can use a client device 308 to reply to the email using a reply email (or, can send a new email to the sender) as illustrated at step 6. The reply mail can be sent via email server 306 in operative communication with recipient client device 308.

In yet another aspect, upon receipt of the reply email, email server 306 can encrypt the reply email using the public key of the sender, as illustrated at step 7. Further, as illustrated at step 8, email server 306 can send the encrypted reply email along with the public key of the recipient to email server 304. In an alternate exemplary embodiment, when the public key of the recipient at this instance is same as at step 2, email server 306 may send only the encrypted reply email as public key of the recipient is already available to email server 304, as illustrated at step 304.

In an aspect, upon receipt of the encrypted reply email, email server 304 can decrypt the encrypted reply email using the private key of the sender, as illustrated at step 9. Further, email server 304 can send/transmit the decrypted reply email to client device 302 of the sender, as shown at step 10.

FIG. 3B illustrates working of the system of the present disclosure when an email server at the sender side is configured with the system of the present disclosure, while the recipient client device is configured with an existing public-key based encryption system (for example, GPG).

In an aspect, a sender side email server 304 can be configured with the system of the present disclosure and be in operative communication with a sender's client device 302. A recipient client device 308 can be configured with an existing public-key based encryption system (for example GPG or PGP).

In another aspect, at step 1, a sender can use a client device 302 to send an outgoing email directed to a recipient via sender side email server 304, as shown at step 1. In yet another aspect, email server 304 can encrypt the email using the public key of the recipient as shown at step 2, and can send the encrypted email along with public key of the sender to the recipient client device 308, as shown at step 3.

In an aspect, since the recipient client device 308 is configured with an existing public-key based encryption system, it can decrypt the email using the private key of the recipient, as shown at step 4.

In another aspect, recipient client device 308 can encrypt a reply email (or any other email directed to the sender) using the public key of the sender, as shown at step 5. In yet another aspect, recipient client device 308 can transmit the encrypted reply email along with the public key of the recipient to sender side email server 304, as shown at step 6. In an exemplary embodiment, if public key of the recipient at this instance is same as that at step 2, recipient client device 308 need not send the key again. In yet another exemplary embodiment, recipient client device 308 can send a new public key of the recipient that can be next used by the sender side email server 304 for encrypting an email for the recipient, for greater security.

In an aspect, upon receipt of the encrypted reply email, email server 304 can use the private key of the sender to decrypt the encrypted reply email as shown at step 7, and can transmit the decrypted reply email to the sender's client device 302 as shown at step 8.

Figure 4A:
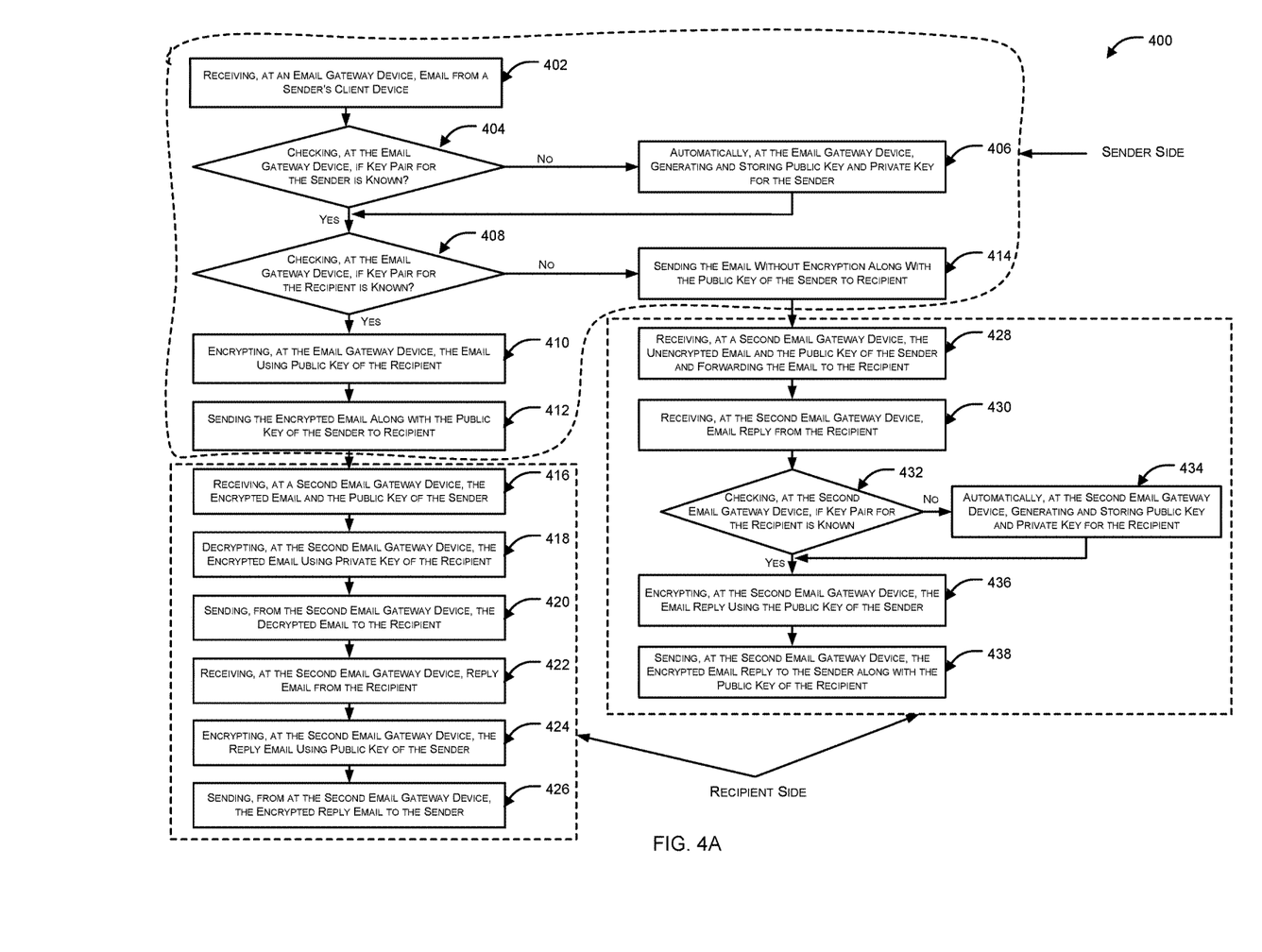
FIG. 4A is a detailed flow diagram illustrating a process for performing automatic encryption and decryption of emails exchanged between client devices in accordance with an embodiment of the present invention.

FIG. 4A is a detailed flow diagram 400 illustrating a process for performing automatic encryption and decryption of emails exchanged between client devices in accordance with an embodiment of the present invention.

In an aspect, the process can include, at step 402, receiving, at a first email server, an outbound email from a sender's client device, and at step 404, checking, at the first email server, if key pair for the sender is known.

In another aspect, the process can include, at step 406, automatically, by the first email server, generating and storing a temporary key pair (i.e., a public key and a private key) for the sender when the key pair for the sender is not known. In an aspect, the process can include, at step 408, checking, at the first email server, if the public key for the recipient is known, and proceeding to step 414 of sending the email unencrypted when the public key for the recipient is not known. On the other hand, if public key of the recipient is known, at step 410, encrypting, at the first email server, the email using the public key of the recipient and, at step 412, sending the encrypted email along with the public key of the sender to a second email server (of the recipient), and then proceeding to step 416.

In another aspect, the process can include, at step 416, receiving, at the second email server, the encrypted email and the public key of the sender (included with the email in the form of an attachment, for example, in step 412).

In yet another aspect, the process can include, at step 418, decrypting, at the second email server, the encrypted email using the private key of the recipient, and, at step 420, sending, from the second email server, the decrypted email to the recipient (to the recipient's client device).

In an aspect, the process can include, at step 422, receiving, at the second email server, reply email from the recipient (from the recipient's client device), and at step 424, encrypting, at the second email server, the reply email using public key of the sender. In another aspect, the process can include, at step 426, sending, from the second email server, the encrypted reply email to the first email server (of the sender).

In yet another aspect, the process can include, at step 428, receiving, at the second email server, the unencrypted email and the public key of the sender (sent as in step 414) and forwarding the email to the recipient (to the recipient's client device). In an aspect, the process can include, at step 430, receiving, at the second email server, reply email from the recipient (from the recipient's client device), and at step 432, checking, at the second email server, if key pair for the recipient is known. The process can then include, at step 434, automatically, at the second email server, generating and storing public key and private key for the recipient if key pair for the recipient is not known, and at step 436, encrypting at the second email server, the reply email using the public key of the sender, if key pair for the recipient is known so as to, at step 438, send, from the second email server (of the recipient), the encrypted reply email to the first email server (of the sender) along with the public key of the recipient.

Figure 4B:
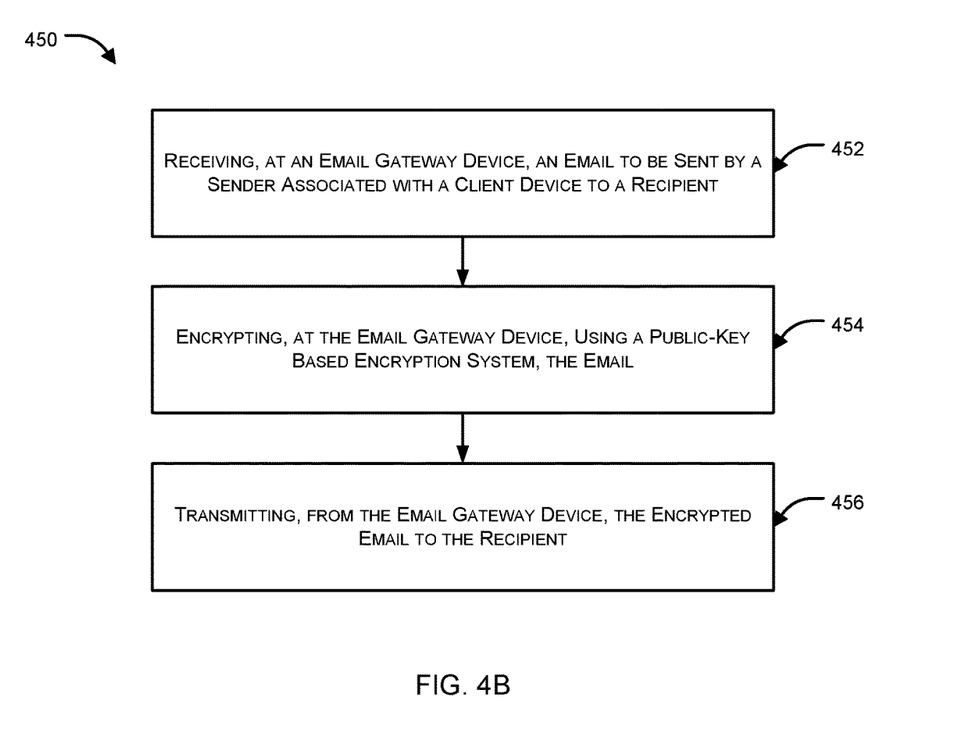
FIG. 4B is a high-level flow diagram illustrating a process for performing automatic encryption and decryption of emails exchanged between client devices in accordance with an embodiment of the present invention.

FIG. 4B is a high-level flow diagram 450 illustrating a process for performing automatic encryption and decryption of emails exchanged between client devices in accordance with an embodiment of the present invention. At block 452, an email is received at an email gateway device that is to be sent by a sender associated with a client device to a recipient. At block 454, the email is encrypted by the email gateway device using a public-key based encryption system. At block 456, the encrypted email is transmitted from the email gateway device to the recipient.

Figure 5:
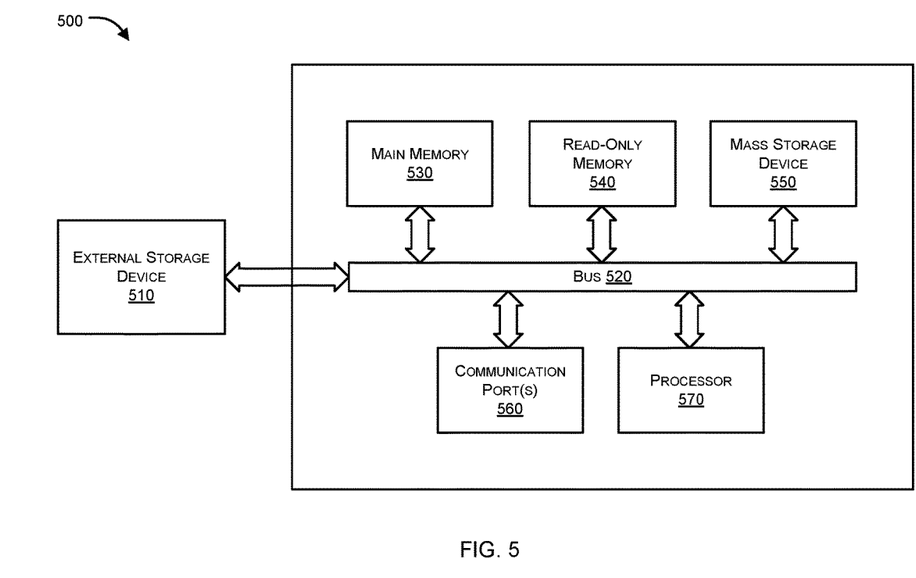
FIG. 5 illustrates an exemplary computer system in which or with which embodiments of the present invention may be utilized.

FIG. 5 illustrates an exemplary computer system in which or with which embodiments of the system of the present disclosure may be utilized. Computer system 500 may represent all or a portion of an email server (e.g., email gateway device 104-1, 104-2, 200, 304 or 306).

As shown, computer system 500 comprises a bus 520, a processor 570, communication port(s) 560, a main memory 530, an external storage device 510, a read-only memory 540 and a mass storage device 550. Computer system 500 may include more than one processor and communication port.

Examples of processor 570 comprise, but are not limited to, an Intel® Itanium® or Itanium® 2 processor(s), or AMD® Opteron® or Athlon MP® processor(s), Motorola® lines of processors, FortiSOC™ system on a chip processors or other processors. Processor 570 may comprise various modules associated with embodiments of the embodiments herein.

Communication port 560 may be any of an RS-232 port for use with a modem based dialup connection, a 10/100 Ethernet port, a Gigabit or 10 Gigabit port using copper or fiber, a serial port, a parallel port, or other existing or other ports. Communication port 560 may be chosen depending on a network, such a Local Area Network (LAN), Wide Area Network (WAN), or any network to which computer system 500 connects.

Memory 530 may be Random Access Memory (RAM), or any other dynamic storage device commonly used. Read-only memory 540 may be any static storage device(s); e.g., but not limited to, a Programmable Read Only Memory (PROM) chips for storing static information; e.g. start-up or BIOS instructions for processor 570.

Mass storage device 550 may be any type of mass storage solution, which may be used to store information and/or instructions. Exemplary mass storage solutions comprise, but are not limited to, Parallel Advanced Technology Attachment (PATA) or Serial Advanced Technology Attachment (SATA) hard disk drives or solid-state drives (internal or external; e.g., having Universal Serial Bus (USB) and/or Firewire interfaces), and one or more optical discs, Redundant Array of Independent Disks (RAID) storage; e.g. an array of disks (e.g., SATA arrays).

Bus 520 communicatively couples processor(s) 570 with the other memory, storage and communication blocks. Bus 520 may be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 570 to a software system.

Optionally, wired operator and administrative interfaces; e.g. a display, keyboard, and a cursor control device, may also be coupled to bus 520 to support direct operator interaction with computer system 500. Other operator and administrative interfaces may be provided through network connections connected through communication port 560.

External storage device 510 may be any kind of external hard-drives, floppy drives, IOMEGA® Zip Drives, Compact Disc-Read Only Memory (CD-ROM), Compact Disc-Rewritable (CD-RW), Digital Video Disk-Read Only Memory (DVD-ROM). Components described above are meant only to exemplify various possibilities. In no way should the aforementioned exemplary computer system 600 limit the scope of the embodiments herein.

While embodiments of the system of the present disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

What is claimed is:

1. A method comprising:
  receiving, by an electronic mail (email) server associated with a private network, from a client device coupled with the private network, a first email message originated by a local sender using the client device and directed to a remote recipient, wherein the local sender is a first user of a plurality of users associated with the private network and wherein the remote recipient is not a user associated with the private network;

querying, by the email server, one or more key servers for a public key of the remote recipient;

when the public key of the remote recipient is returned by the one or more key servers, then using the public key of the remote recipient by the email server to encrypt the first email message;

when the public key of the remote recipient does not exist, then foregoing encryption of the first email message;

querying, by the email server, the one or more key servers for a public key of the local sender;

when the public key of the local sender does not exist on the one or more key servers, then automatically generating, by the email server, a temporary key pair for the local sender on the fly and without requiring intervention on the part of the local sender, wherein the temporary key pair for the local sender includes the public key of the local sender and a private key of the local sender; and transmitting, by the email server, both the email message and the public key of the local sender to the remote recipient.

2. The method of claim 1, wherein the temporary key pair comprises a Pretty Good Privacy (PGP) key pair or a GNU Privacy Guard (GPG) key pair.

3. The method of claim 1, wherein said transmitting, by the email server, both the first email message and the public key of the local sender to the remote recipient comprises including the public key of the local sender as an attachment to the first email message.

4. The method of claim 1, further comprising storing, by the email server, the private key of the local sender within a secured storage area accessible by the email server.

5. The method of claim 4, wherein the secured storage area is selected from any or a combination of a secured random access memory (RAM) and an encrypted disk.

6. The method of claim 4, wherein the private key of the local sender is protected by an authentication process.

7. The method of claim 6, wherein the authentication process comprises a biometric authentication.

8. The method of claim 1, further comprising prior to said transmitting, by the email server, both the email and the public key of the local sender to the remote recipient, digitally signing, by the email server, the first email message.

9. The method of claim 1, further comprising:
receiving, by the email server, a second email message from a remote sender and directed to a local recipient, wherein the local recipient is a second user of the plurality of users;
extracting, by the email server, a public key of the remote sender from an attachment associated with the second email message;
storing, by the email server, the public key of the remote sender for future use; and
when the email message is encrypted with a public key of the local recipient, then prior to delivery of the email message to the local recipient, decrypting the email message, by the email server, with a private key of the local recipient.

10. An electronic mail (email) server associated with a private network, the email server comprising:
a non-transitory storage device having embodied therein instructions representing one or more routines; and
one or more processors coupled to the non-transitory storage device and operable to execute the one or more routines to perform a method comprising:
receiving from a client device coupled with the private network a first email message originated by a local sender using the client device and directed to a remote recipient, wherein the local sender is a first user of a plurality of users associated with the private network and wherein the remote recipient is not a user associated with the private network;
querying one or more key servers for a public key of the remote recipient;
when the public key of the remote recipient is returned by the one or more key servers, then using the public key of the remote recipient to encrypt the first email message;
when the public key of the remote recipient does not exist, then foregoing encryption of the first email message;
querying the one or more key servers for a public key of the local sender;
when the public key of the local sender does not exist on the one or more key servers, then automatically generating a temporary key pair for the local sender on the fly and without requiring intervention on the part of the local sender, wherein the temporary key pair for the local sender includes the public key of the local sender and a private key of the local sender; and
transmitting both the email message and the public key of the local sender to the remote recipient.

11. The email server of claim 10, wherein the temporary key pair comprises a Pretty Good Privacy (PGP) key pair or a GNU Privacy Guard (GPG) key pair.

12. The email server of claim 10, wherein said transmitting both the first email message and the public key of the local sender to the remote recipient comprises including the public key of the local sender as an attachment to the first email message.

13. The email server of claim 10, wherein the method further comprises storing the private key of the local sender within a secured storage area accessible by the email server.

14. The email server of claim 13, wherein the secured storage area is selected from any or a combination of a secured random access memory (RAM) and an encrypted disk.

15. The email server of claim 13, wherein the private key of the local sender is protected by an authentication process.

16. The email server of claim 15, wherein the authentication process comprises a biometric authentication.

17. The email server of claim 10, wherein the method further comprises prior to said transmitting both the email and the public key of the local sender to the remote recipient, digitally signing the first email message.

18. The email server of claim 10, wherein the method further comprises:
receiving a second email message from a remote sender and directed to a local recipient, wherein the local recipient is a second user of the plurality of users;
extracting a public key of the remote sender from an attachment associated with the second email message;
storing the public key of the remote sender for future use; and
when the email message is encrypted with a public key of the local recipient, then prior to delivery of the email message to the local recipient, decrypting the email message with a private key of the local recipient.

19. The method of claim 1, wherein each key of the temporary key pair comprises a 2048-bit key.

20. The email server of claim 10, wherein each key of the temporary key pair comprises a 2048-bit key.

\* \* \* \* \*